United States Patent
Kobayashi

(10) Patent No.: US 9,532,076 B2
(45) Date of Patent: Dec. 27, 2016

(54) APPARATUS AND METHOD FOR ENCODING COMBINED IMAGE INCLUDING DIFFERENT IMAGES

(75) Inventor: Yukifumi Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 640 days.

(21) Appl. No.: 13/300,515

(22) Filed: Nov. 18, 2011

(65) Prior Publication Data

US 2012/0140827 A1 Jun. 7, 2012

(30) Foreign Application Priority Data

Dec. 2, 2010 (JP) ................................. 2010-269731

(51) Int. Cl.
| | | |
|---|---|---|
| *H04N 19/86* | (2014.01) | |
| *H04N 13/00* | (2006.01) | |
| *H04N 19/167* | (2014.01) | |
| *H04N 19/597* | (2014.01) | |
| *H04N 19/176* | (2014.01) | |
| *H04N 19/126* | (2014.01) | |
| *H04N 19/55* | (2014.01) | |
| *H04N 19/117* | (2014.01) | |

(52) U.S. Cl.
CPC ............ *H04N 19/86* (2014.11); *H04N 13/004* (2013.01); *H04N 13/0048* (2013.01); *H04N 19/126* (2014.11); *H04N 19/167* (2014.11); *H04N 19/176* (2014.11); *H04N 19/597* (2014.11); *H04N 19/865* (2014.11); *H04N 19/117* (2014.11); *H04N 19/55* (2014.11)

(58) Field of Classification Search
CPC .................... H04N 7/26824; H04N 19/00642; H04N 21/21805; H04N 7/181; H04N 19/124; H04N 19/126; H04N 19/80; H04N 19/82; H04N 19/85; H04N 19/86; H04N 19/865
See application file for complete search history.

(56) References Cited

U.S. PATENT DOCUMENTS

| | | | |
|---|---|---|---|
| 7,254,824 B1* | 8/2007 | Gordon et al. | 725/54 |
| 2003/0128882 A1* | 7/2003 | Kim et al. | 382/239 |
| 2005/0034155 A1* | 2/2005 | Gordon et al. | 725/39 |
| 2006/0177123 A1* | 8/2006 | Ha | 382/154 |
| 2006/0245493 A1* | 11/2006 | Wang | 375/240.03 |
| 2009/0028246 A1* | 1/2009 | Miyoshi et al. | 375/240.16 |

(Continued)

FOREIGN PATENT DOCUMENTS

JP 2010-068315 A 3/2010

OTHER PUBLICATIONS

ITU-T Recommendation H.264 (Nov. 2007).*

*Primary Examiner* — David N Werner
(74) *Attorney, Agent, or Firm* — Canon USA, Inc. IP Division

(57) ABSTRACT

In an image coding apparatus to process a frame image generated by combining a plurality of different images in the side-by-side method as a coding target image, information which specifies an image block in contact with a boundary of the plurality of images is input to the image coding apparatus. A control unit sets a predetermined coding control parameter which reduces or inhibits filtering with a deblocking filter on the image block in contact with the boundary of the plurality of images specified based on the input information.

15 Claims, 8 Drawing Sheets

| RELATION BETWEEN p, q AND INTRA MACRO BLOCK | Bs VALUE |
|---|---|
| AT LEAST ONE OF p AND q BELONGS TO INTRA MACRO BLOCK AND IS LOCATED ON MACRO BLOCK BOUNDARY. | Bs=4 |
| ANY ONE OF p AND q BELONGS TO INTRA MACRO BLOCK AND IS NOT LOCATED ON MACRO BLOCK BOUNDARY. | Bs=3 |
| NEITHER p NOR q BELONGS TO INTRA MACRO BLOCK AND ANY ONE OF THEM HAS ORTHOGONAL TRANSFORM COEFFICIENT. | Bs=2 |
| NEITHER p NOR q BELONGS TO INTRA MACRO BLOCK AND HAS A TRANSFORM COEFFICIENT, HOWEVER THEY ARE DIFFERENT IN REFERENCE PICTURE OR MOTION VECTOR VALUE. | Bs=1 |
| NEITHER p NOR q BELONGS TO INTRA MACRO BLOCK AND HAS A TRANSFORM COEFFICIENT. THEIR REFERENCE PICTURES AND MOTION VECTOR VALUES ARE IDENTICAL. | Bs=0 |

(56) References Cited

U.S. PATENT DOCUMENTS

| | | | |
|---|---|---|---|
| 2009/0028249 A1* | 1/2009 | Gomila | H04N 19/597 |
| | | | 375/240.29 |
| 2009/0141814 A1* | 6/2009 | Yin | H04N 13/0007 |
| | | | 375/240.29 |
| 2009/0213930 A1* | 8/2009 | Ye et al. | 375/240.03 |
| 2009/0316793 A1* | 12/2009 | Yang et al. | 375/240.24 |
| 2011/0026608 A1* | 2/2011 | Luthra | H04N 21/2365 |
| | | | 375/240.26 |
| 2011/0037835 A1* | 2/2011 | Morino | H04N 13/0003 |
| | | | 348/51 |
| 2011/0261050 A1* | 10/2011 | Smolic | G06T 15/20 |
| | | | 345/419 |

* cited by examiner

FIG. 5

| IndexA (TO α) OR IndexB (TO β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 0 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| IndexA (TO α) OR IndexB (TO β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

BOUNDARY OF DIFFERENT IMAGES

FIG. 8

| RELATION BETWEEN p, q AND INTRA MACRO BLOCK | Bs VALUE |
|---|---|
| AT LEAST ONE OF p AND q BELONGS TO INTRA MACRO BLOCK AND IS LOCATED ON MACRO BLOCK BOUNDARY. | Bs=4 |
| ANY ONE OF p AND q BELONGS TO INTRA MACRO BLOCK AND IS NOT LOCATED ON MACRO BLOCK BOUNDARY. | Bs=3 |
| NEITHER p NOR q BELONGS TO INTRA MACRO BLOCK AND ANY ONE OF THEM HAS ORTHOGONAL TRANSFORM COEFFICIENT. | Bs=2 |
| NEITHER p NOR q BELONGS TO INTRA MACRO BLOCK AND HAS A TRANSFORM COEFFICIENT, HOWEVER THEY ARE DIFFERENT IN REFERENCE PICTURE OR MOTION VECTOR VALUE. | Bs=1 |
| NEITHER p NOR q BELONGS TO INTRA MACRO BLOCK AND HAS A TRANSFORM COEFFICIENT. THEIR REFERENCE PICTURES AND MOTION VECTOR VALUES ARE IDENTICAL. | Bs=0 |

APPARATUS AND METHOD FOR ENCODING COMBINED IMAGE INCLUDING DIFFERENT IMAGES

BACKGROUND OF THE INVENTION

Field of the Invention

Embodiments of the present invention relate to an image coding apparatus and an image coding method, more particularly to a technique for applying a filtering operation on a boundary of an image block.

Description of the Related Art

Recently, consumer use televisions capable of displaying a three-dimensional image (in other words, stereoscopic image or 3D image) have been prevailing. According to the principle of the three-dimensional image, an image for the left eye and an image for the right eye, which are created using the parallax between the left eye and the right eye, are projected into corresponding eyes individually to achieve a stereoscopic vision.

A variety of recording formats are available for the three-dimensional image and the side-by-side method is one of those formats. The side-by-side method is a three-dimensional image recording format in which an image for the left eye and an image for the right eye are subsampled by ½ each in the horizontal direction and the subsampled image for the left eye is arranged on the left side of a screen while the subsampled image for the right eye is arranged on the right side of the screen. The side-by-side method is adopted for satellite broadcasting and may be said to be one of the current mainstream recording formats for three-dimensional image. Japanese Patent Application Laid-Open No. 2010-068315 discusses a technique concerning the recording of three-dimensional image data based on the side-by-side method.

When a moving image is transmitted via a television broadcast wave or a moving image is recorded on an optical disk or a hard disk by a video camera or the like, usually, compressing and coding of the moving image is performed to reduce an information amount of the moving image. As one of typical moving image compressing and coding methods, H.264 (Moving Picture Experts Group 4 (MPEG4)-advanced video coding (AVC)) coding method is available. The H.264 coding method has been widely spreading so that it has been adopted as standards for advanced video coding high definition (AVCHD) which is a high definition recording method of video cameras, and One Seg broadcasting of terrestrial digital broadcasting. In future, the moving image compressing and coding technique is expected to be used when any three-dimensional image is captured by a video camera or the like and recorded in an optical disk or a hard disk. For example, the configuration of an apparatus may be considered in which a three-dimensional image by the side-by-side method is compressed and coded according to the H.264 coding method and recorded in a storage medium.

However, a following issue may occur when the three-dimensional image by the side-by-side method is compressed and coded using the H.264 coding method.

According to the side-by-side method, the image for the left eye and the image for the right eye are arranged in parallel and treated as a single image, so that a boundary between a right end of the image for the left eye and a left end of the image for the right eye exists in a central portion of a coding target image. According to the H.264 coding method, an inter-loop filter referred to as a deblocking filter is defined in its standard document and filtering is performed on the boundary between blocks in an image. The H.264 coding method is an effective processing for removing block noise if the image is a conventional two-dimensional image. In case of the side-by-side type image, right and left portions with respect to the boundary between the right end of the image for the left eye and the left end of the image for the right eye are separate images, so that the filtering deteriorates the quality of the images on the boundary.

Depending on cases, it may be preferable to omit the filtering processing on a specific region even if the procedure is defined in the standard document when an image generated by combining a plurality of different images is a coding target image.

SUMMARY OF THE INVENTION

One disclosed aspect of the embodiments is directed to a technique for making filtering processing by a deblocking filter different between regions if a frame image generated by combining a plurality of different images is a coding target image.

According to an aspect of the embodiments, an image coding apparatus capable of coding a frame image generated by combining a plurality of images includes an input unit configured to input information for specifying an image block which is in contact with a boundary of the plurality of images in a frame image as a coding target, a coding unit configured, after performing motion prediction, orthogonal transform, and quantization on the coding target frame image, to code the quantized image data, a local decoding unit configured to generate a local decode image by performing on the image data de-quantization which is inverse to the quantization and inverse orthogonal transform which is inverse to the orthogonal transform, a filtering unit configured to perform filtering on the local decode image with a deblocking filter, and a control unit configured to set a predetermined coding control parameter which reduces or inhibits filtering with the deblocking filter on the image block in contact with the boundary of the plurality of images which is specified based on the information input by the input unit.

According to another aspect of the embodiments, a method for coding a frame image generated by combining a plurality of images includes inputting information for specifying an image block which is in contact with a boundary of the plurality of images in a frame image as a coding target, performing motion prediction, orthogonal transform, and quantization on the coding target frame image, and then coding the quantized image data, generating a local decode image by performing on the image data de-quantization which is inverse to the quantization and inverse orthogonal transform which is inverse to the orthogonal transform, performing filtering on the local decode image with a deblocking filter, and setting a predetermined coding control parameter which reduces or inhibits filtering with the deblocking filter on the image block in contact with the boundary of the plurality of images which is specified based on the input information.

Further features and aspects of the embodiments of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the embodiments.

FIG. 5 illustrates an example of calculation tables for α and β.

FIG. 8 illustrates an example of conditions for a Bs value.

DESCRIPTION OF THE EMBODIMENTS

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
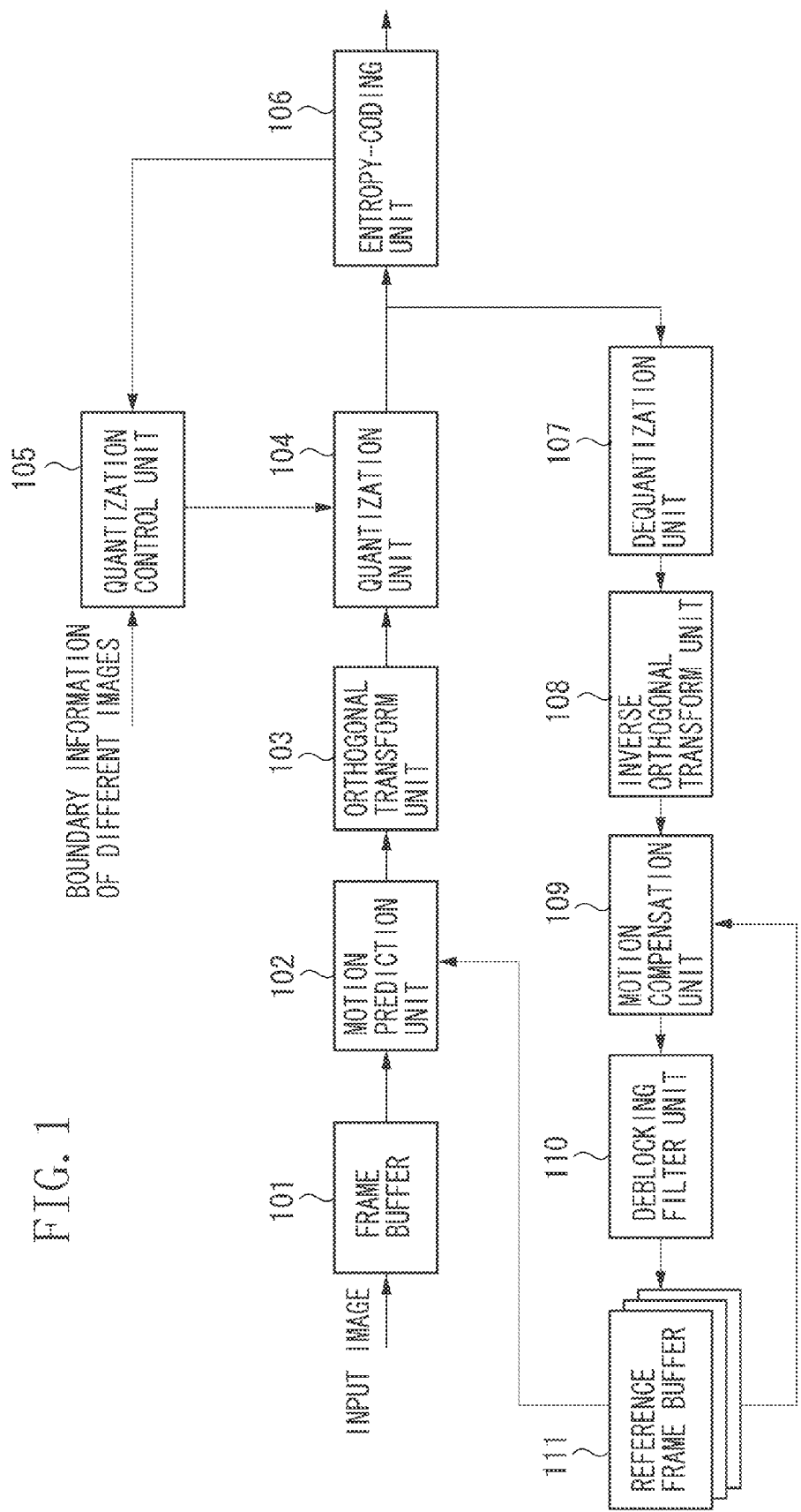
FIG. 1 is a block diagram illustrating a configuration of an image coding apparatus according to a first exemplary embodiment.
Figure 2:
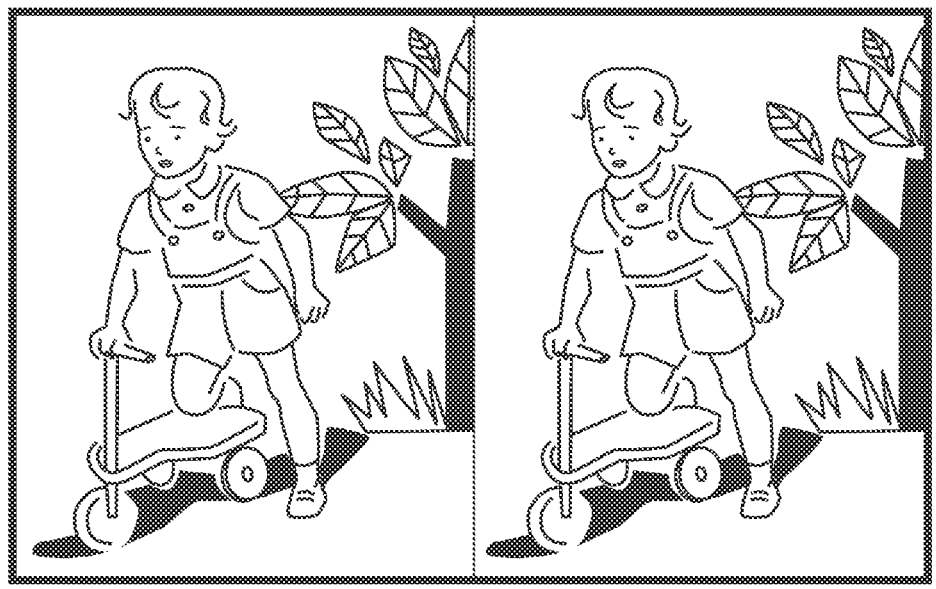
FIG. 2 illustrates an example of a three-dimensional image by the side-by-side method.

FIG. 1 is a block diagram illustrating a configuration of an image coding apparatus according to a first exemplary embodiment. FIG. 2 illustrates an example of a three-dimensional image by the side-by-side method. Referring to FIG. 2, a left image is an image for the left eye and a right image is an image for the right eye. The left and right images are generated by subsampling an original image by ½ each in a horizontal direction. As a result, a boundary between the right and left images exists in a central portion of the frame image (in a screen), as illustrated in FIG. 2.

The image coding apparatus illustrated in FIG. 1 performs coding on the image as illustrated in FIG. 2 as an input image (coding target image). The image coding apparatus illustrated in FIG. 1 will be described below by taking a coding apparatus which compresses and codes a moving image according to the H.264 coding method as an example.

In FIG. 1, an input image is stored in a frame buffer 101 serving as a temporary storage medium. The input image described here refers to a coding target image data and corresponds to each frame image constituting the moving image or an image block constituting the frame image.

A motion prediction unit 102 performs block-matching between a coding target image stored in the frame buffer 101 and a reference image stored in a reference frame buffer 111 to detect a motion vector. The reference image described here is an image to be referred to in intra-prediction (prediction in a frame) or in inter-prediction (motion compensation prediction between different frames), which is performed according to the H.264 coding, and is generated from coded frame image data or coded image block data. The detected motion vector is utilized for generation of a prediction image upon the inter-prediction. In the intra-prediction, the motion prediction unit 102 performs prediction processing on a difference of pixels in an identical frame image of the coding target image stored in the frame buffer 101, by referring to the reference image.

In the inter-prediction, the motion prediction unit 102 obtains a difference in pixels between the coding target image and the reference image at a position of the detected motion vector and outputs difference image data indicating the difference to an orthogonal transform unit 103. On the other hand, in the intra-prediction, the motion prediction unit 102 outputs the difference image data which is intra-predicted according to a predetermined intra-prediction mode to the orthogonal transform unit 103. The orthogonal transform unit 103 performs orthogonal transform, for example, discrete cosine transform at an integer accuracy on the transmitted difference image data, generates a transform coefficient, and outputs the generated transform coefficient to a quantization unit 104.

The quantization unit 104 performs quantization on the received transform coefficient according to a quantization parameter output from a quantization control unit 105. A quantized transform coefficient is transmitted to an entropy-coding unit 106. The quantized transform coefficient is also transmitted to a de-quantization unit 107 to generate a local decode image used as the reference image.

The entropy-coding unit 106 performs zigzag scan, alternate scan or the like on the quantized transform coefficient and further performs variable length coding such as context-adaptive variable length coding (CAVLC) or arithmetic coding such as context-adaptive binary arithmetic coding (CABAC) thereon. The entropy-coding unit 106 adds variable-length coded coding method information about a motion vector, a quantization parameter, and macro block division information to the coded image data to generate a coding stream. Further, when performing coding, the entropy-coding unit 106 calculates an amount of generated code of each image block (which is a macro block serving as a unit for coding) and transmits its information to the quantization control unit 105.

The quantization control unit 105 determines a quantization parameter which is a coding control parameter. Boundary information of an image, more specifically, information indicating whether each macro block is in contact with a boundary of an image constituted of a plurality of images (e.g., a three-dimensional image by the side-by-side method) is input to the quantization control unit 105 from an apparatus for supplying the input image. The boundary information of the image is information for specifying the image block in contact with the boundary of a plurality of different images.

The image coding apparatus according to the present exemplary embodiment may selectively input a two-dimensional image and a combined image such as a three-dimensional image and perform coding on the respective images. When coding an ordinary two-dimensional image, the quantization control unit 105 receives information about the amount of generated code from the entropy-coding unit 106, determines a quantization parameter so as to reach the amount of code complying with a target bit rate, and outputs the determined quantization parameter to the quantization unit 104. On the other hand, if a coding target is an image constituted of a plurality of different images, such as a three-dimensional image by the side-by-side method and a combined image using picture-in-picture, the quantization control unit 105 is configured to change a method for determining the quantization parameter according to whether a macro block is in contact with the boundary of different images.

If the macro block to be coded is not in contact with the boundary of different images, the quantization control unit 105 determines the quantization parameter according to the above-described information indicating whether the macro block is in contact with the boundary of images, to obtain the amount of code complying with the target bit rate similar to the case of the two-dimensional image. On the other hand, if the macro block to be coded is in contact with the boundary of different images, the quantization control unit 105 determines the quantization parameter as a certain predetermined value (predetermined value Qp_noflt).

The predetermined value of the quantization parameter means a value with which the filtering to the boundary of different images with the deblocking filter is not performed. The predetermined value of the quantization parameter may be introduced from the definition of the H.264 coding method in the standard document. The detail will be described below in a description of a deblocking filter 110.

Figure 3:
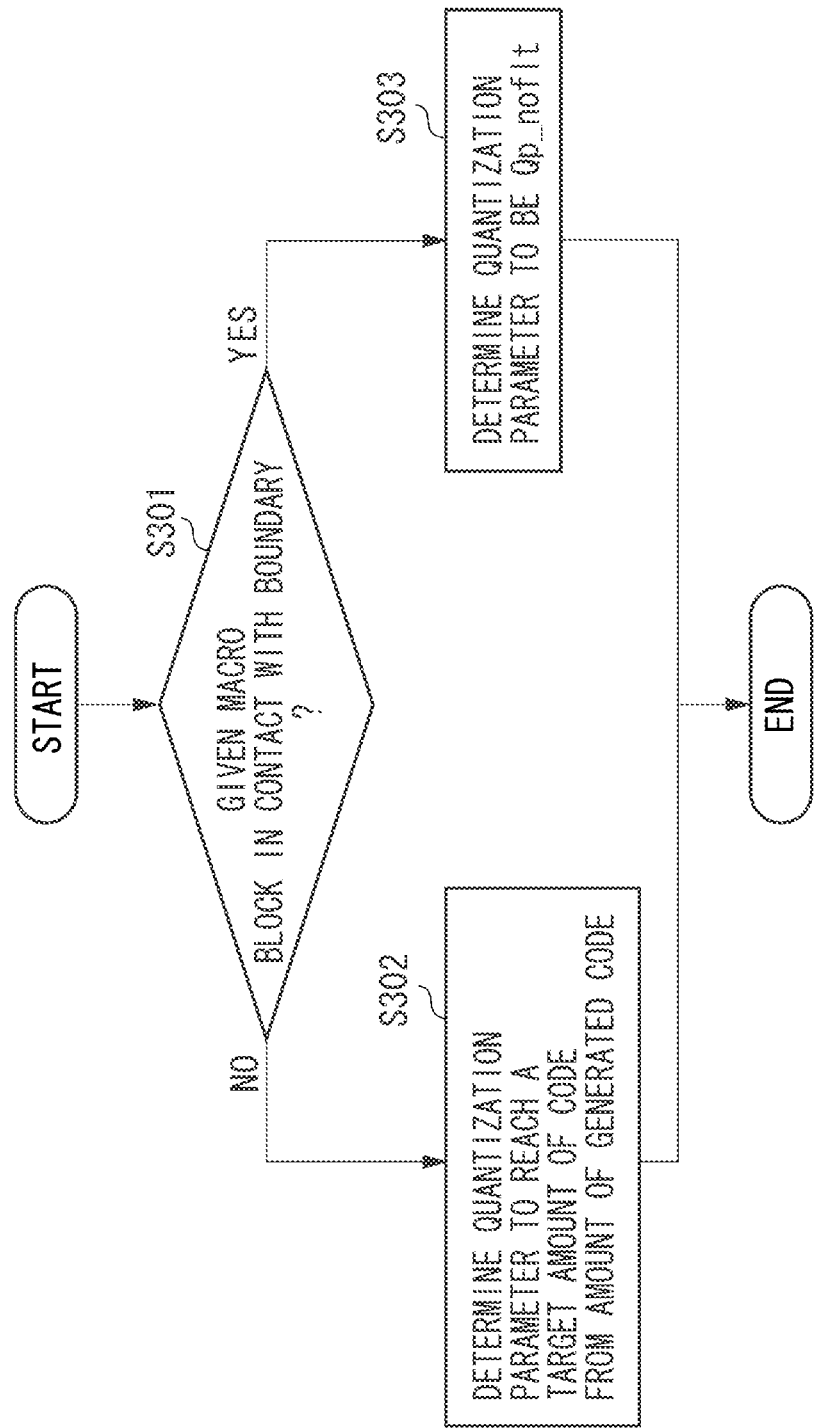
FIG. 3 is a flow chart illustrating an operation flow of a quantization control unit.

FIG. 3 is a flow chart illustrating an operation flow of the quantization control unit 105. Referring to FIG. 3, in the case of a combined image such as the three-dimensional image, in operation S301, the quantization control unit 105 determines whether a coding target macro block is in contact with the boundary of different images. If the coding target macro block is not in contact with the boundary of different images (NO in operation S301), then in operation S302, the quantization control unit 105 determines the quantization parameter such that the target amount of code is obtained from the amount of generated code in the usually manner.

If the coding target macro block is in contact with the boundary of different images (YES in operation S301), then in operation S303, the quantization control unit 105 determines the quantization parameter as the predetermined value (Qp_noflt) which omits filtering with the deblocking filter. Then, the quantization parameter is determined and output to the quantization unit 104.

Returning to FIG. 1, the de-quantization unit 107 performs inverse quantization on the input transform coefficient after quantization to restore the transform coefficient and outputs the restored transform coefficient to an inverse orthogonal transform unit 108. The inverse orthogonal transform unit 108 performs inverse transform, which is inverse to the transform performed by the orthogonal transform unit 103, on the input transform coefficient to restore its difference image data. The difference image data is output to a motion compensation unit 109.

The motion compensation unit 109 reads reference image data at the motion vector position from the reference frame buffer 111 and adds the reference image data to the input difference image data to generate local decode image data. The generated local decode image data is output to the deblocking filter unit 110.

The deblocking filter unit 110 performs the filtering processing on the input local decode image data by means of the deblocking filter. The image data after filtered with the deblocking filter is stored in the reference frame buffer 111 as data indicating the reference image. In the above-described manner, the image coding apparatus according to the present exemplary embodiment generates a coding stream and local decode image data.

Figure 4:
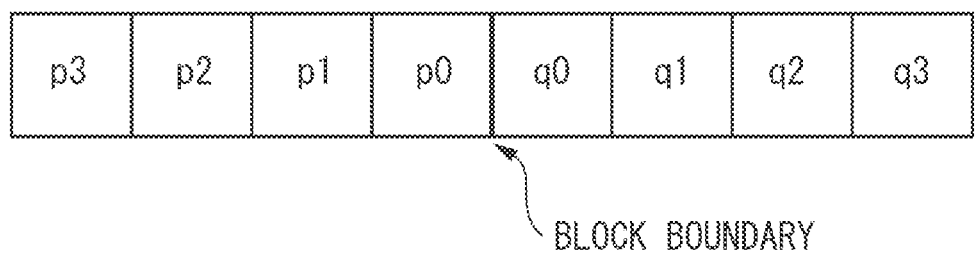
FIG. 4 illustrates pixel values on a block boundary.

Next, the deblocking filter unit 110 will be described in detail. FIG. 4 illustrates pixel values on the block boundary. FIG. 4 indicates the pixel values p0, p1, p2, p3, q0, q1, q2, and q3 on the boundary in a frame image. A boundary of a macro block containing a pixel p and a macro block containing the pixel q exists between the pixels p0 and q0.

The deblocking filter unit 110 performs filtering processing with the deblocking filter on the local decode image data according to the standard on the H.264 coding method. If a condition presented by a following equation (1) is established here, no filtering processing with the deblocking filter is performed on the block boundary according to the standard on the H.264 coding method.

$$|p0-q0|>\alpha \text{ or } |p1-q0|>\beta \text{ or } |q1-q0|>\beta \quad (1)$$

Where $\alpha$ and $\beta$ are respectively defined in a table corresponding to values Index A and Index B. Index A and Index B are calculated from the quantization parameter and an offset value relative to a filter strength. FIG. 5 indicates definitions of $\alpha$ and $\beta$ relative to Index A and Index B. FIG. 5 illustrates an example of calculation table for $\alpha$ and $\beta$.

The quantization parameters of two blocks to be filtered, more specifically, the quantization parameters of the block containing p0, p1, p2, and p3 and the block containing q0, q1, q2, and q3 are defined as QpA and QpB respectively. An average of those two quantization parameters is defined as Qpay. In the coding stream, offset values specified by slice_alpha_c0_offset_div2 and slice_beta_offset_div2 are defined as FilterOffsetA and FilterOffsetB, respectively. In this case, IndexA and IndexB are expressed in the form of equation (2) and equation (3).

$$\text{Index}A = Qpav + \text{FilterOffset}A \quad (2)$$

$$\text{Index}B = Qpav + \text{FilterOffset}B \quad (3)$$

According to the table in FIG. 5, when IndexA is less than 15, $\alpha=0$ and when IndexB is less than 15, $\beta=0$. When $\alpha=0$ or $\beta=0$, the condition of the equation (1) is satisfied and therefore, no filtering with the deblocking filter is performed on the given block boundary.

Thus, the value of Qp_noflt determined by the quantization control unit 105 is set as a value which attains $\alpha=0$ or $\beta=0$ from the equations (2), (3) and the table in FIG. 5. Then, the value of Qp_noflt is set so that any one of following equations (4), (5) is established.

$$Qp\_noflt = 15 - \text{FilterOffset}A \quad (4)$$

$$Qp\_noflt = 15 - \text{FilterOffset}B \quad (5)$$

For example, if FilterOffsetA=0, it comes that Qp_noflt=15 from the equation (4). A block in contact with the boundary of different images is set to 15 by the quantization control unit 105. As a result, the quantization parameters QpA and QpB of the two blocks to be filtered are set to QpA=15 and QpB=15 respectively and therefore, the average of the two quantization parameters is Qpav=15.

Because FilterOffsetA=0, it comes that IndexA=15 from the equation (2). Because $\alpha=0$ according to the table in FIG. 5, the condition of $|p0-q0|>\alpha$ in the equation (1) is established. Therefore, no filtering with the deblocking filter is performed on this block boundary.

As described above, the quantization control unit 105 acquires information indicating whether a block to be processed is in contact with the boundary of different images. If the block to be processed is in contact with the boundary of different images, the quantization control unit 105 sets a predetermined quantization parameter as a coding control parameter for controlling the filtering with the above-described deblocking filter according to the acquired information.

In other words, the quantization control unit 105 may reduce or inhibit filtering with the deblocking filter by setting the quantization parameter as a predetermined value smaller than a certain value. The predetermined value may be calculated using the above-described equation. Thus, by omitting the filtering of the boundary of different images with the deblocking filter while enabling the filtering of other image areas with the deblocking filter, the image coding apparatus according to the present exemplary embodiment may obtain an excellent quality image without any deterioration of the boundary area.

Figure 6:
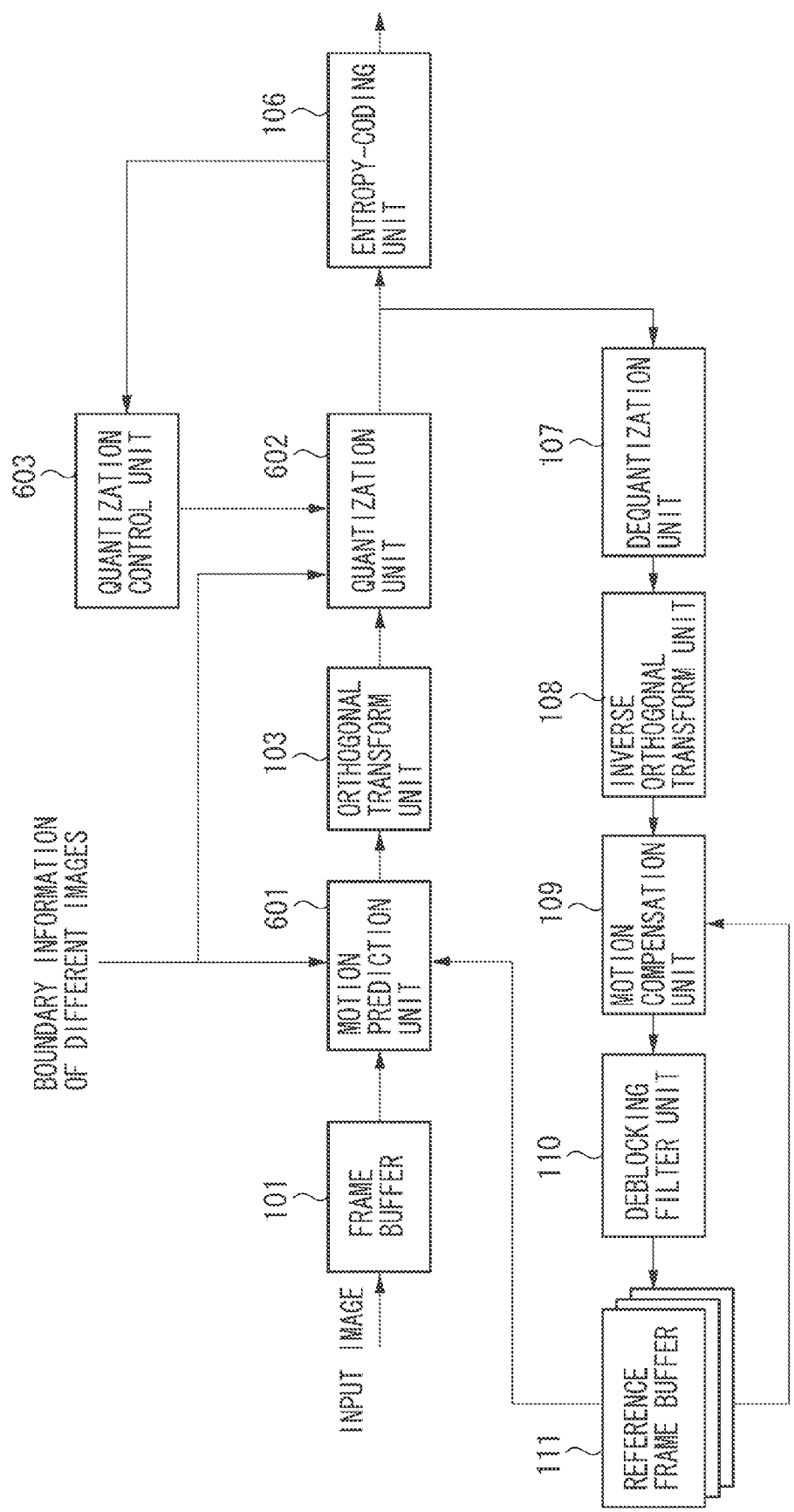
FIG. 6 is a block diagram illustrating a configuration of an image coding apparatus according to a second exemplary embodiment.

FIG. 6 is a block diagram illustrating a configuration of an image coding apparatus according to a second exemplary embodiment. The image coding apparatus in FIG. 6 performs coding on an image like the one illustrated in FIG. 2 as an input image (coding target image). The image coding apparatus illustrated in FIG. 6 will be described below by taking a coding apparatus which compresses and codes a moving image according to the H.264 coding method as an example.

Referring to FIG. 6, an input image (coding target image) is stored in a frame buffer 101 serving as a temporary storage medium. A motion prediction unit 601 performs block-matching between a coding target image stored in the frame buffer 101 and a reference image stored in a reference frame buffer 111 to detect a motion vector.

In inter-prediction, the motion prediction unit 601 obtains a difference in pixels between the coding target image and the reference image at a position of the detected motion vector and outputs difference image data indicating the difference to an orthogonal transform unit 103. On the other hand, in intra-prediction, the motion prediction unit 601 outputs the difference image data which is intra-predicted according to a predetermined intra prediction mode to the orthogonal transform unit 103.

The image coding apparatus according to the second exemplary embodiment may selectively input a two-dimensional image and a combined image such as a three-dimensional image and perform coding on the respective images. In coding of the three-dimensional image, the image coding apparatus changes the contents of motion prediction processing according to whether a coding target macro block is in contact with a boundary of different images.

More specifically, boundary information of an image, namely information indicating whether each macro block is in contact with a boundary of an image constituted of a plurality of images (e.g., a three-dimensional image by the side-by-side method) is input to the motion prediction unit 601 from an apparatus for supplying the input image. The boundary information of the image is information for specifying the image block in contact with the boundary of a plurality of different images.

If the coding target macro block is not in contact with the boundary of different images according to this information, the motion prediction unit 601 detects a motion vector by executing the block matching as an ordinary operation like when coding a two-dimensional image. On the other hand, if the coding target macro block is in contact with the boundary of different images, the motion prediction unit 601 generates a coding control parameter different from that in the ordinary operation and controls the two macro blocks in contact with each other across the boundary so that the two macro blocks refer to an identical reference image and indicate an identical motion vector.

Figure 7:
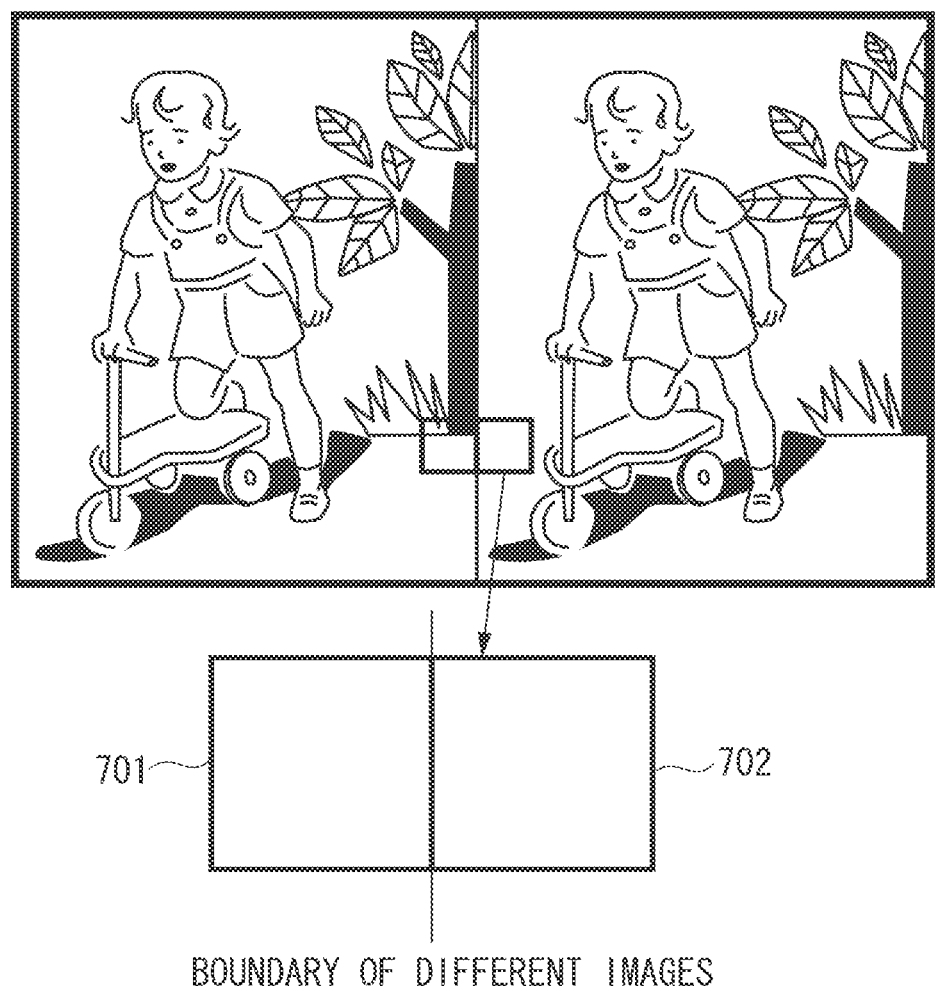
FIG. 7 illustrates two macro blocks adjacent to each other across a boundary of different images.

FIG. 7 illustrates the two macro blocks adjacent to each other across the boundary of different images. Referring to FIG. 7, a macro block 701 and a macro block 702 are in contact with the boundary of different images. The motion prediction unit 601 forcibly controls these two macro blocks to calculate an identical motion vector by referring to an identical reference image.

As an example, the coding control parameter for calculating the identical motion vector may be set to share a calculation result obtained from any one of the two macro blocks or a preliminarily determined motion vector value (for example, vector (0, 0) of an origin position) may be set in each of them. Alternatively, it is permissible to perform block matching on the macro block 701 and the macro block 702 as a pair and detect their motion vectors so that the two macro blocks turn into an identical motion vector.

The orthogonal transform unit 103 performs orthogonal transform, such as discrete cosine transform, on received difference image data at an integer accuracy to generate a transform coefficient and outputs the generated transform coefficient to a quantization unit 602.

The quantization unit 602 performs quantization processing on the received transform coefficient. The processing by the quantization unit 602 varies according to whether the coding target macro block is in contact with the boundary of different images. More specifically, the boundary information of an image, namely information indicating whether each macro block is in contact with a boundary of an image constituted of a plurality of images (e.g., a three-dimensional image by the side-by-side method) is input to the quantization unit 602 from an apparatus for supplying the input image. The boundary information of the image is information for specifying the image block in contact with the boundary of a plurality of different images.

If the coding target macro block is not in contact with the boundary of different images according to this information, the quantization unit 602 perform quantization according to the quantization parameter output by a quantization control unit 603. On the other hand, if the coding target macro block is in contact with the boundary of different images, the quantization unit 602 perform quantization by generating a special coding control parameter regardless of the quantization parameter value output from the quantization control unit 603. The special coding control parameter sets a quantization parameter which turns all the transform coefficients after quantization to zero.

In any case, the quantized transform coefficient is transmitted to an entropy-coding unit 106. Additionally, the quantized transform coefficient is transmitted to a de-quantization unit 107 to generate a local decode image used as the reference image.

The entropy-coding unit 106 performs zigzag scan, alternate scan or the like on the quantized transform coefficient, and further performs variable length coding such as CAVLC or arithmetic coding such as CABAC. The entropy-coding unit 106 adds variable-length coded coding method information about a motion vector, a quantization parameter, and macro block division information to the coded image data to generate a coding stream. Further, when performing coding, the entropy-coding unit 106 calculates an amount of generated code of each macro block and transmits its information to the quantization control unit 603.

The quantization control unit 603 receives information about the amount of generated code from the entropy-coding unit 106, determines a quantization parameter so as to reach the amount of code complying with a target bit rate, and outputs the determined quantization parameter to the quantization unit 602.

The de-quantization unit 107 performs inverse quantization on the input transform coefficient after quantization to restore the transform coefficient and outputs the restored transform coefficient to an inverse orthogonal transform unit 108. The inverse orthogonal transform unit 108 performs inverse transform, which is inverse to the transform performed by the orthogonal transform unit 103, on the input transform coefficient to restore its difference image data. The difference image data is output to a motion compensation unit 109.

The motion compensation unit 109 reads reference image data at the motion vector position from the reference frame buffer 111 and adds the reference image data to the input difference image data to generate local decode image data. The generated local decode image data is output to a deblocking filter unit 110.

The deblocking filter unit 110 performs the filtering processing on the input local decode image data by means of the deblocking filter. The image data after filtered with the deblocking filter is stored in the reference frame buffer 111 as data indicating the reference image. In the above-described manner, the image coding apparatus according to the present exemplary embodiment generates a coding stream and local decode image data.

The deblocking filter unit 110 performs filtering processing with the deblocking filter according to the standard on the H.264 coding method. According to the standard of the H.264 coding method, as illustrated in FIG. 8, when Bs=0, filtering with the deblocking filter is not performed on the block boundary. A value of boundary strength (Bs) in FIG. 8 indicates a strength of the block boundary of images, which may be Bs=0 to 4. FIG. 8 indicates a condition for determining the Bs value. Here, p and q indicate two macro blocks located across the block boundary. In FIG. 7, the macro block 701 is p and the macro block 702 is q.

Under control of the motion prediction unit 601, the two blocks in contact with the boundary of different images have an identical reference image and motion vector respectively. For the two blocks in contact with the boundary of different images, the quantization unit 602 controls all the transform coefficients after quantization to be zero. Due to these conditions, it comes that Bs=0 according to FIG. 8. Thus, according to the present exemplary embodiment, filtering with the deblocking filter may not be performed on the boundary of different images.

As described above, filtering with the deblocking filter may be reduced or inhibited on the boundary of different images by using an identical reference image and an identical motion vector to the two blocks located across the boundary of different images and turning all the transform coefficients after quantization to zero. Thus, by omitting the filtering of the boundary of different images with the deblocking filter while enabling the filtering of other image areas with the deblocking filter, the image coding apparatus according to the present exemplary embodiment may obtain an excellent quality image without any deterioration of the boundary area.

The first and second exemplary embodiments are described by taking a case of acquiring information indicating whether an input image is in contact with a boundary of images when the input image is a three-dimensional image by the side-by-side method or the like, as an example. However, it is permissible to have a configuration which allows the boundary to be detected within the image coding apparatus.

For example, a block located at a predetermined coordinate of an input image may be specified to be a block in contact with a boundary of the image in advance. Alternatively, a detection unit (not illustrated) may detect a block boundary by detecting a correlation between macro blocks.

Further, the embodiments may be applied to a two-dimensional image generated by combining by picture-in-picture as well as a three-dimensional image by the side-by-side method.

Each processing illustrated in FIG. 3 according to the first exemplary embodiment may be achieved by reading a computer program for achieving each processing function from a memory of a system which allows the coding apparatus according to one embodiment to be activated and then causing a central processing unit (CPU) of the system to execute the computer program. In this case, the computer program stored in the memory constitutes one disclosed aspect of the embodiments.

The above-described program may be a program which achieves a part of those functions. Further, the program may be a difference file (difference program) which may achieve the above-described functions by combining with a program recorded in advance in the computer.

All or partial functions of each processing illustrated in FIG. 3 may be realized with a special hardware. Further, a program for achieving the function of each processing illustrated in FIG. 3 may be stored in a computer-readable non-transitory storage medium and the program stored in the storage medium may be read into a computer and executed therein to perform each processing. In the meantime, the computer system described here includes an operating system and hardware such as peripherals.

The computer-readable storage medium may include portable media, such as a flexible disk, a magneto-optical disk, a read-only memory (ROM), and a compact disk (CD)-ROM, and a storage device incorporated in a computer system, for example, a hard disk. In addition, the computer-readable storage medium may include a server to which a program is transmitted via a network, e.g., Internet or a communication line, e.g., telephone line, and a volatile memory (e.g., a random access memory (RAM)) contained in a computer system serving as a client, which store a program for a certain period of time.

The above-described program may be transmitted from a computer system that stores the program in a storage device to other computer system via a transmission medium or via a transmission wave in the transmission medium. The transmission medium for transmitting the program refers to a medium having a function of transmitting information, like a network (communication network), e.g., Internet or a communication line, e.g., telephone line.

A program product such as the computer-readable storage medium which stores the above-described program may be included in the embodiments. The above-described program, storage medium, transmission medium and program product are included in the scope of the embodiments.

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., an image coding apparatus, a frame image, a deblocking filter). In addition, the operations in the method transform the elements or parts from one state to another state. The transformation is particularized and focused on coding a frame image. The transformation provides a different function or use such as performing motion prediction, generating a local decode image, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While one or more aspects of the embodiments have been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-269731 filed Dec. 2, 2010, which is hereby incorporated by reference herein in its entirety.

What is claimed is:

1. A coding apparatus comprising:
a first generating unit that generates first difference image data from a target block included in a combined image and a reference block included in a reference image, wherein the combined image includes a first image, a second image, and an image boundary separating the first image and the second image;
a first conversion unit that converts the first difference image data into first converted data;
a quantization control unit that generates a quantization parameter, the quantization parameter being used in an expression in a coding standard to determine not to perform deblocking at the image boundary and to determine whether or not to perform deblocking at a block boundary separating blocks in the combined image and different than the image boundary;
a quantization unit that quantizes the first converted data using the quantization parameter to generate quantized data;
an encoding unit that encodes the quantized data;
an inverse quantization unit that inversely quantizes the quantized data to generate second converted data;
a second conversion unit that converts the second converted data into second difference image data;
a second generating unit that generates a decoded image data from the second difference image data;
a filtering unit that determines whether or not to apply a deblocking filter to the decoded image data according to the quantization parameter and the expression if the target block is not next to the image boundary, and determines not to apply the deblocking filter to the decoded image data according to the quantization parameter and the expression if the target block is next to the image boundary; and
a processor that acts as at least one of the first generating unit, the first conversion unit, the quantization unit, the encoding unit, the inverse quantization unit, the second conversion unit, the second generating unit, the filtering unit, or the quantization control unit.

2. The coding apparatus according to claim 1, wherein if the target block is next to the image boundary, the quantization parameter represents a value which satisfies a condition of the expression.

3. The coding apparatus according to claim 1, wherein the target block corresponds to a macro block.

4. The coding apparatus according to claim 1, wherein the combined image is based on a side-by-side method.

5. The coding apparatus according to claim 1, wherein the combined image is used to generate a three dimensional image.

6. The coding apparatus according to claim 1, wherein the first image is for a left eye, and the second image is for a right eye.

7. A method comprising:
- generating first difference image data from a target block included in a combined image and a reference block included in a reference image, wherein the combined image includes a first image, a second image, and an image boundary separating the first image and the second image;
- converting the first difference image data into first converted data;
- generating a quantization parameter, the quantization parameter being used in an expression in a coding standard to determine not to perform deblocking at the image boundary and to determine whether or not to perform deblocking at a block boundary separating blocks in the combined image and different than the image boundary;
- quantizing the first converted data using the quantization parameter to generate quantized data;
- encoding the quantized data;
- inversely quantizing the quantized data to generate second converted data;
- converting the second converted data into second difference image data;
- generating a decoded image data from the second difference image data; and
- causing a filtering unit to determine whether or not to apply a deblocking filter to the decoded image data according to the quantization parameter and the expression if the target block is not next to the image boundary, and causing the filtering unit to determine not to apply the deblocking filter to the decoded image data according to the quantization parameter and the expression if the target block is next to the image boundary.

8. The method according to claim 7, wherein if the target block is next to the image boundary, the quantization parameter represents a value which satisfies a condition of the expression.

9. The method according to claim 7, wherein the target block corresponds to a macro block.

10. The method according to claim 7, wherein the combined image is based on a side-by-side method.

11. The method according to claim 7, wherein the combined image is used to generate a three dimensional image.

12. The method according to claim 7, wherein the first image is for a left eye, and the second image is for a right eye.

13. A non-transitory storage medium that stores a program for causing a computer to execute a method, the method comprising:
- generating first difference image data from a target block included in a combined image and a reference block included in a reference image, wherein the combined image includes a first image, a second image, and an image boundary separating the first image and the second image;
- converting the first difference image data into first converted data;
- generating a quantization parameter, the quantization parameter being used in an expression in a coding standard to determine not to perform deblocking at the image boundary and to determine whether or not to perform deblocking at a block boundary separating blocks in the combined image and different than the image boundary;
- quantizing the first converted data using the quantization parameter to generate quantized data;
- encoding the quantized data;
- inversely quantizing the quantized data to generate second converted data;
- converting the second converted data into second difference image data;
- generating a decoded image data from the second difference image data; and
- causing a filtering unit to determine whether or not to apply a deblocking filter to the decoded image data according to the quantization parameter and the expression if the target block is not next to the image boundary, and causing the filtering unit to determine not to apply the deblocking filter to the decoded image data according to the quantization parameter and the expression if the target block is next to the image boundary.

14. The non-transitory storage medium according to claim 13, wherein the first image is for a left eye, and the second image is for a right eye.

15. The non-transitory storage medium according to claim 13, wherein if the target block is next to the image boundary, the quantization parameter represents a value which satisfies a condition of the expression.

* * * * *